United States Patent
Takahashi

(10) Patent No.: US 11,152,035 B2
(45) Date of Patent: Oct. 19, 2021

(54) IMAGE PROCESSING DEVICE AND METHOD OF CONTROLLING THE SAME

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/831,514

(22) Filed: Mar. 26, 2020

(65) Prior Publication Data

US 2020/0312376 A1    Oct. 1, 2020

(30) Foreign Application Priority Data

Mar. 29, 2019 (JP) .............................. JP2019-068851

(51) Int. Cl.
G11B 27/34 (2006.01)
G11B 27/031 (2006.01)
G11B 27/00 (2006.01)

(52) U.S. Cl.
CPC ............ G11B 27/34 (2013.01); G11B 27/002 (2013.01); G11B 27/031 (2013.01)

(58) Field of Classification Search
CPC ...... G11B 27/34; G11B 27/002; G11B 27/031
See application file for complete search history.

(56) References Cited

U.S. PATENT DOCUMENTS

| 2005/0235211 A1* | 10/2005 | Chen | G11B 27/34 715/723 |
| 2006/0140580 A1* | 6/2006 | Hiroi | G11B 27/105 386/241 |
| 2014/0133835 A1* | 5/2014 | Sekiguchi | G11B 27/34 386/278 |

FOREIGN PATENT DOCUMENTS

JP    2006-270805 A    10/2006

* cited by examiner

*Primary Examiner* — Mishawn N. Hunter
(74) *Attorney, Agent, or Firm* — Canon U.S.A., Inc. IP Division

(57) ABSTRACT

An image processing device includes an acquisition unit, a determination unit, and a control unit. The acquisition unit is configured to acquire a serial image obtained by capturing a plurality of images continuously. The determination unit is configured to determine a specified section of the serial image. The control unit is configured to move a selection position in response to a moving operation for moving the selection position in the serial image. In a first mode, the control unit performs control to move the selection position to a position corresponding to a head of the specified section in response to the moving operation, In a second mode, the control unit performs control to move the selection position to a position corresponding to a rear end of the specified section in response to the moving operation.

19 Claims, 9 Drawing Sheets

IMAGE PROCESSING DEVICE AND METHOD OF CONTROLLING THE SAME

BACKGROUND

Field

The present disclosure relates to an image processing device that can move a playback position of a serial image.

Description of the Related Art

In recent years, electronic devices such as digital cameras and smartphones have enabled long-time image capturing of moving images. The captured moving images are not left stored in storage within the electronic devices, but are updated in a shared storage service such as a cloud storage via a network. A method of using a moving image such as browsing the moving image as content by disclosing the moving image to specified or unspecified users through a shared storage service has become common. While some shared storage services, such as the cloud storage, can be updated without any restrictions, many of the services make it a condition that billing be performed. Conversely, since a moving image up to a predetermined length and a predetermined capacity can be updated free of charge in many cases, another method of use is to edit a captured long moving image to a predetermined length and then to update the image to a storage service. Therefore, it is important to be able to easily edit a moving image captured in the electronic device.

There are many conventional techniques for quickly editing a moving image.

As disclosed in Japanese Patent Laid-Open No. 2006-270805, there is a moving image editing technique to select a starting point frame in a moving image by moving a cursor, then to select an end point frame by moving the cursor again, and to edit video information from the starting point to the end point.

SUMMARY

In accordance with an aspect of the present disclosure, it is determined that with the above-discussed technique Japanese Patent Laid-Open No. 2006-270805, when selecting a starting point for editing a moving image, it is necessary to move the cursor on a frame list to select the starting point, and thus moving the starting point takes time. In consideration thereof, in accordance with another aspect of the present disclosure, when moving a selection position such as a playback position in a serial image, an image processing device controls a moving destination of the selection position in response to a moving operation, making it possible to shorten operation time to move the selection position according to an operation state.

According to another aspect of the present disclosure, there is provided an image processing device including an acquisition unit, a determination unit, and a control unit. The acquisition unit is configured to acquire a serial image obtained by capturing a plurality of images continuously. The determination unit is configured to determine a specified section of the serial image. The control unit is configured to move a selection position in response to a moving operation for moving the selection position in the serial image. In a first mode, the control unit performs control to move the selection position to a position corresponding to a head of the specified section in response to the moving operation, and in a second mode, the control unit performs control to move the selection position to a position corresponding to a rear end of the specified section in response to the moving operation.

Further features of the present disclosure will become apparent from the following description of exemplary embodiments (with reference to the attached drawings).

BRIEF DESCRIPTION OF THE DRAWINGS

FIGS. 4-1, 4-2, 4-3, 4-4, 4-5, and 4-6 are views showing a screen transition of moving image playback processing.

FIGS. 5-1, 5-2, 5-3, 5-4, and 5-5 are views showing a screen transition of moving image editing processing.

FIG. 6 is a diagram showing a basic flow of the moving image editing processing.

DESCRIPTION OF THE EMBODIMENTS

Exemplary embodiments of the present disclosure will be described below with reference to the drawings. As a device to which the present disclosure is applicable, the present exemplary embodiment will describe a digital camera as an example. However, the present disclosure is applicable not only to a digital camera but also to an electronic device having an image processing function that enables playback of serial images (moving image, continuously captured image) including a mobile terminal such as a smartphone, tablet, and personal computer.

Figure 1:
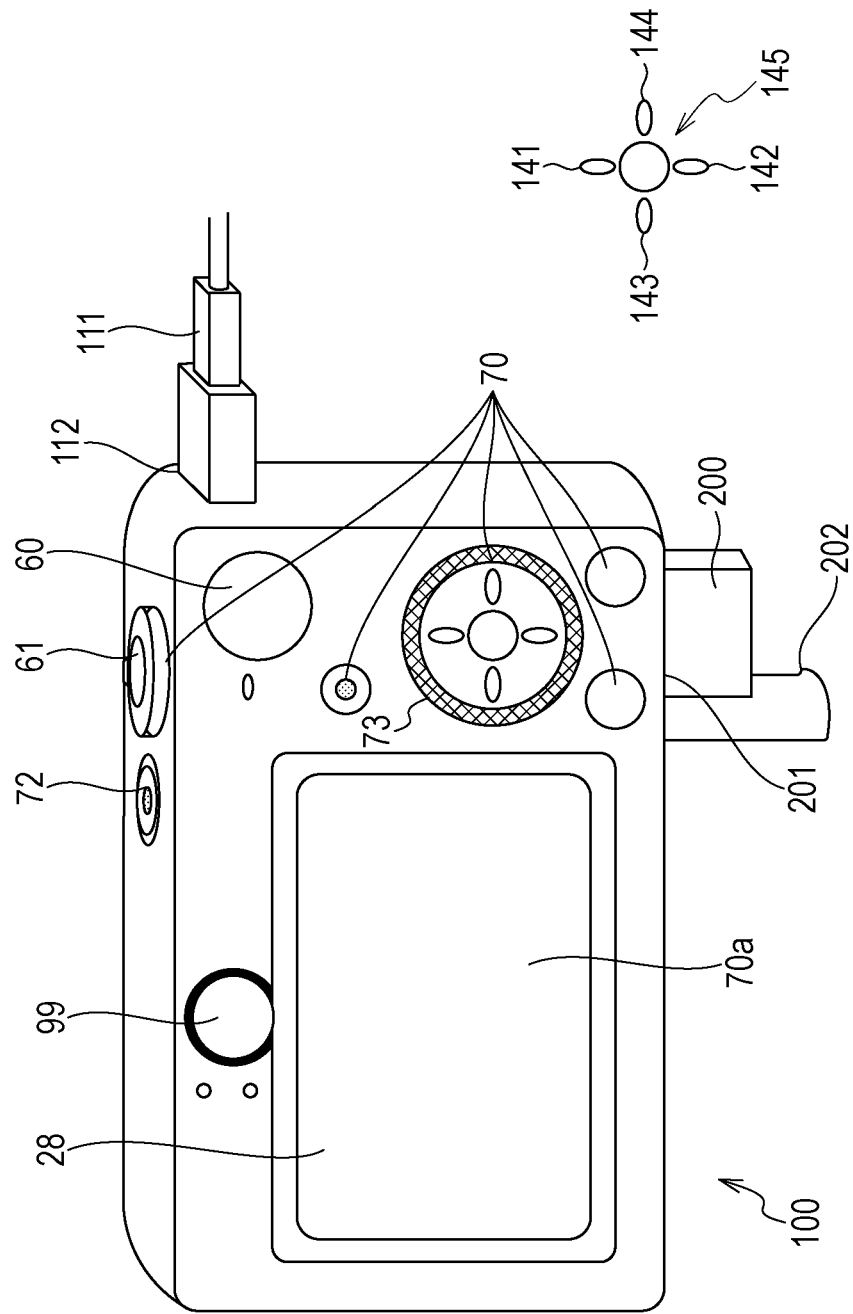
FIG. 1 is a view showing one example of an external appearance of an image capturing device.

FIG. 1 is an external appearance view of a digital camera. A display unit 28 is a display unit that displays images and various information items. A shutter button 61 is an operation unit for giving image capturing instructions. A mode selection switch 60 is an operation unit for switching various modes. A connector 112 is a connector between a connection cable 111 for connecting to an external device such as a personal computer or a printer, and the digital camera 100. An operation unit 70 is an operation unit including operation members, such as various switches, buttons, and touch panels, that receive various operations from a user. A controller wheel 73 is an operation member that is included in the operation unit 70 and allows a rotating operation. A power switch 72 is a push button for switching between power on and power off A recording medium 200 is a recording medium such as a memory card or a hard disk. A recording medium slot 201 is a slot for storing the recording medium 200. The recording medium 200 stored in the recording medium slot 201 can communicate with the digital camera 100, and can perform recording and playback. A lid 202 is a lid of the recording medium slot 201. FIG. 1 shows a state in which the lid 202 is opened and part of the recording medium 200 is taken out from the slot 201 and exposed.

Figure 2:
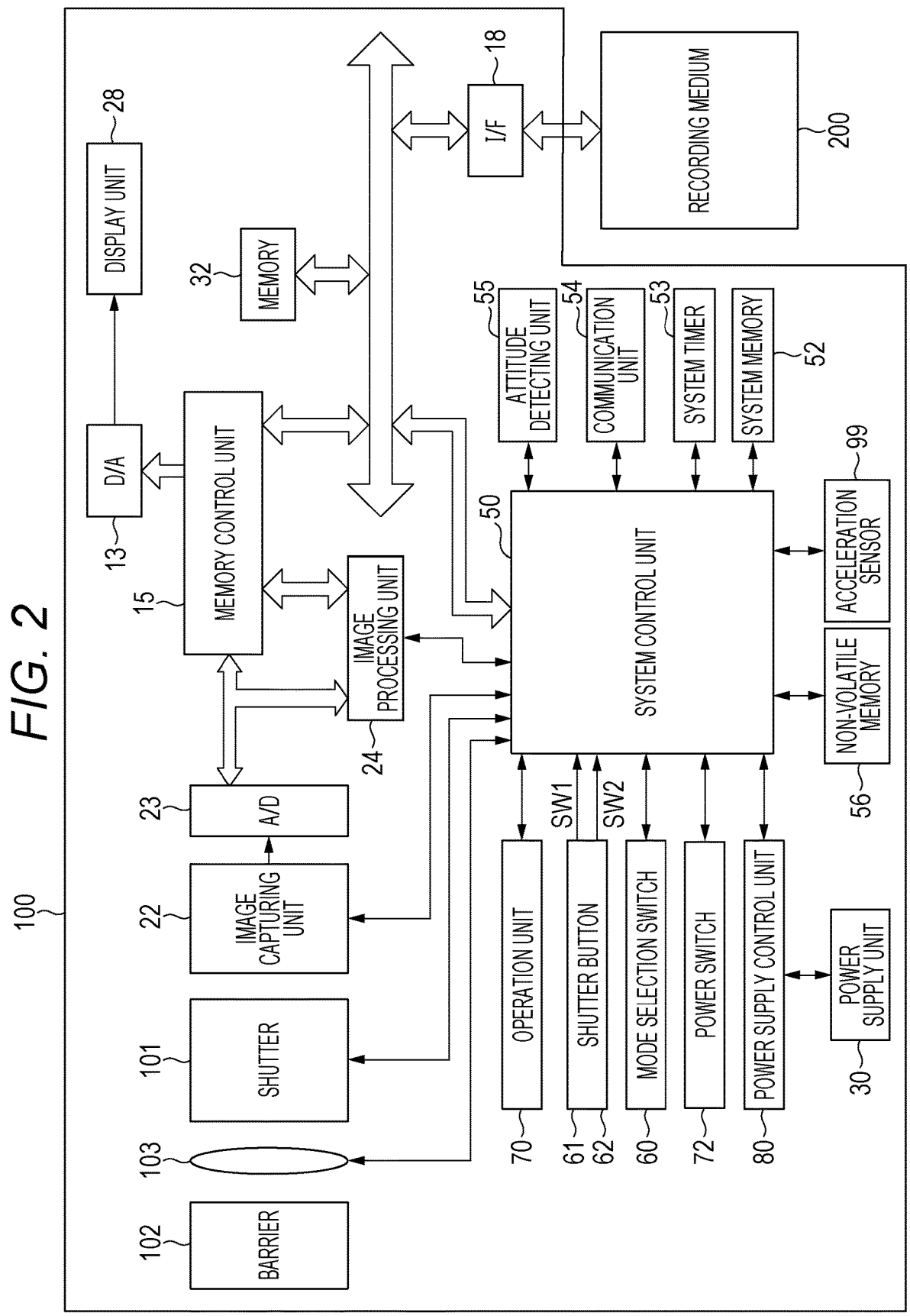
FIG. 2 is a diagram showing one example of a hardware configuration of the image capturing device.

FIG. 2 is a block diagram showing an exemplary configuration of the digital camera 100 according to the present exemplary embodiment.

In FIG. 2, an image capturing lens 103 is a lens group including a zoom lens and a focus lens. A shutter 101 is a shutter having an aperture function. An image capturing unit 22 is an image capturing element including a charge-coupled device (CCD), a complementary metal oxide semiconductor (CMOS) device, or the like that converts an optical image into an electrical signal. An A/D converter 23 converts an analog signal into a digital signal. The A/D converter 23 is used to convert an analog signal output from the image capturing unit 22 into a digital signal. A barrier 102 covers an image pickup system including the image capturing lens 103 of the digital camera 100, preventing the image pickup system including the image capturing lens 103, the shutter 101, and the image capturing unit 22 from becoming dirty or damaged.

An image processing unit 24 performs resizing processing or color conversion processing such as predetermined pixel interpolation or reduction on data from the A/D converter 23 or data from a memory control unit 15. Also, the image processing unit 24 performs predetermined calculation processing using captured image data, and a system control unit 50 performs exposure control and ranging control on the basis of an obtained calculation result. With this configuration, autofocus (AF) processing, automatic exposure (AE) processing, and flash preliminary emission (EF) processing of a through the lens (TTL) method are performed. The image processing unit 24 further performs predetermined calculation processing using captured image data, and also performs TTL-method automatic white balance (AWB) processing on the basis of the obtained calculation result.

The output data from the A/D converter 23 is written directly into a memory 32 via the image processing unit 24 and the memory control unit 15 or via the memory control unit 15, The memory 32 stores image data obtained by the image capturing unit 22 and converted into digital data by the A/D converter 23, and image data to be displayed on the display unit 28. The memory 32 has a sufficient storage capacity to store the predetermined number of still images, and moving images and sound for a predetermined time.

Also, the memory 32 serves as a memory for image display (video memory). A D/A converter 13 converts the data for image display stored in the memory 32 into an analog signal and supplies the converted analog signal to the display unit 28. In this way, the image data for display written in the memory 32 is displayed by the display unit 28 via the D/A converter 13. The display unit 28 performs display according to the analog signal from the D/A converter 13 on a display device such as a liquid crystal display (LCD). The digital signal that once undergoes A/D conversion by the A/D converter 23 and is accumulated in the memory 32 is converted into the analog signal by the D/A converter 13 and consecutively transferred to the display unit 28 for display. With this operation, the digital camera 100 functions as an electronic viewfinder, and can display live view (live view display).

A non-volatile memory 56 is a memory that serves as a recording medium that can be electrically erased and recorded. For example, an electrically erasable programmable read-only memory (EEPROM) or the like is used. The non-volatile memory 56 stores constants, programs, and the like for operation of the system control unit 50. The program mentioned here refers to a computer program for executing various flowcharts described later in the present exemplary embodiment.

The system control unit 50 is a control unit including at least one processor, and controls the entire digital camera 100. By executing the above-described program recorded in the non-volatile memory 56, the system control unit 50 implements each process of the present exemplary embodiment described later. Flowcharts of FIGS. 3, 6, 7, and 9 are implemented by the system control unit 50 executing the program read from the non-volatile memory 56. A random-access memory (RAM) is used for a system memory 52. In the system memory 52, constants and variables for the operation of the system control unit 50, the program read from the non-volatile memory 56, and the like are unfolded. The system control unit 50 also performs display control by controlling the memory 32, the D/A. converter 13, the display unit 28, and the like.

A system timer 53 is a time measurement unit that measures time used for various controls and time of a built-in clock.

The mode selection switch 60, the shutter button 61, and the operation unit 70 are operation units for inputting various operation instructions to the system control unit 50.

The mode selection switch 60 switches the operation mode of the system control unit 50 to one of a still image recording mode, a moving image capturing mode, a playback mode, and other modes. Modes included in the still image recording mode include an automatic image capturing mode, an automatic scene determination mode, a manual mode, an aperture prioritized mode (Av mode), and a shutter-speed prioritized mode (Tv mode). In addition, the modes include various scene modes, which are image capturing settings for respective captured scenes, program AE modes, custom modes, and other modes. The mode selection switch 60 allows direct switching to any of these modes. Alternatively, after temporarily switching to an image capturing mode list screen by using the mode selection switch 60, one of the plurality of modes displayed may be selected, and the mode may be switched using another operation member. Similarly, the moving image capturing mode may include a plurality of modes.

A first shutter switch 62 is turned on by a so-called half press (image capturing preparation instruction) during the operation of the shutter button 61 provided in the digital camera 100, and generates a first shutter switch signal SW1. In response to the first shutter switch signal SW1, operations such as autofocus (AF) processing, automatic exposure (AE) processing, automatic white balance (AWB) processing, and flash preliminary emission (EF) processing are started.

A second shutter switch 64 is turned on when the operation of the shutter button 61 is completed, that is, by a so-called full press (image capturing instruction), and generates a second shutter switch signal SW2. In response to the second shutter switch signal SW2, the system control unit 50 starts a series of image capturing processing operations from signal reading from the image capturing unit 22 to writing of image data to the recording medium 200.

Respective operation members of the operation unit 70 are appropriately assigned functions for each scene by a selection operation of various function icons displayed on the display unit 28, and function as various function buttons. Examples of the function buttons include a termination button, a return button, an image forward button, a jump button, a narrowing-down button, an attribute change button, and a moving image recording button. For example, when a menu button is pressed, a menu screen that allows various settings is displayed on the display unit 28. A user can intuitively make various settings by using the menu screen displayed on the display unit 28, four-way buttons (upper, lower, left, and right), and a SET button 145. The four-way buttons include an upper button 141, a lower button 142, a left button 143, and a right button 144.

The controller wheel 73 is an operation member that is included in the operation unit 70 and allows a rotating operation, and is used when instructing a selection item together with the four-way buttons. When the controller wheel 73 undergoes a rotating operation, an electric pulse signal is generated according to an amount of the rotating operation, and the system control unit 50 controls each part of the digital camera 100 on the basis of the pulse signal. This pulse signal makes it possible to determine an angle at which the controller wheel 73 undergoes the rotating operation or the number of rotations. Note that the controller wheel 73 may be any operation member as long as the operation member can detect the rotating operation. For example, the controller wheel 73 may be a dial operation member that generates a pulse signal by rotation of the controller wheel 73 itself in response to the rotating operation of a user. Alternatively, the controller wheel 73 may be an operation member, including a touch sensor, that detects a rotation operation of a uses finger on the controller wheel 73 (so-called touch wheel) without rotation of the controller wheel 73 itself.

A power supply control unit 80 includes a battery detecting circuit, a DC-DC converter, a switch circuit for switching a block to be energized, and the like, and detects whether a battery is mounted, the type of battery, and a remaining battery level. Also, the power supply control unit 80 controls the DC-DC converter on the basis of a result of the detection and an instruction of the system control unit 50, and supplies a necessary voltage to each unit including the recording medium 200 for a necessary period.

A power supply unit 30 includes a primary battery such as an alkaline battery and a lithium battery, a secondary battery such as a NiCd battery, a NiMH battery, and a Li battery, and an AC adapter. A recording medium I/F 18 is an interface with the recording medium 200 such as a memory card or a hard disk. The recording medium 200 is a recording medium such as a memory card for recording captured images, and includes a semiconductor memory, an optical disk, a magnetic disk, or the like.

A communication unit 54 is connected by wireless or a wired cable and transmits and receives a video signal, a sound signal, and the like. The communication unit 54 is also connectable to a wireless local area network (LAN) and the Internet. The communication unit 54 can transmit images captured by the image capturing unit 22 (including live view) and images recorded in the recording medium 200, and can receive image data and other various information items from an external device.

An attitude detecting unit 55 detects an attitude of the digital camera 100 with respect to the direction of gravity. On the basis of the attitude detected by the attitude detecting unit 55, it is possible to determine whether the image captured by the image capturing unit 22 is an image captured by holding the digital camera 100 horizontally or an image captured by holding the digital camera 100 vertically. The system control unit 50 can add orientation information corresponding to the attitude detected by the attitude detecting unit 55 to an image file of the image captured by the image capturing unit 22, and rotate and record the image. As the attitude detecting unit 55, an acceleration sensor 99, a gyro sensor, or the like can be used.

Note that as one of the operation unit 70, a touch panel 70a that can detect contact on the display unit 28 is provided. The touch panel 70a and the display unit 28 can be integrally configured. For example, the touch panel 70a is configured such that light transmittance does not disturb the display of the display unit 28, and is attached to an upper layer of a display screen of the display unit 28. Then, input coordinates on the touch panel 70a and display coordinates on the display unit 28 are associated with each other. With this configuration, it is possible to configure a graphical user interface (GUI) as if the user can directly operate the screen displayed on the display unit 28. The system control unit 50 can detect the following operation or state on the touch panel 70a.

A finger or stylus pen that has not touched the touch panel 70a newly touches the touch panel 70a. That is, start of touch (hereinafter referred to as touch-down).

The touch panel 70a is being touched with a finger or stylus pen (hereinafter referred to as touch-on).

A finger or stylus pen is moving while touching the touch panel 70a (hereinafter referred to as touch-move).

The finger or stylus pen touching the touch panel 70a is released. That is, termination of touch (hereinafter referred to as touch-up).

Nothing is touched on the touch panel 70a (hereinafter, referred to as touch-off).

When touch-down is detected, touch-on is also detected at the same time. After touch-down, touch-on is normally detected continuously unless touch-up is detected. Touch-move is also detected when touch-on is detected. Even if touch-on is detected, touch-move is not detected unless the touch position has moved. The touch panel 70a enters touch-off after it is detected that all the touched fingers and stylus pens enter touch-up.

These operation states and the position coordinates where the finger or stylus pen touches the touch panel 70a are notified to the system control unit 50 via an internal bus. The system control unit 50 determines what operation (touch operation) has been performed on the touch panel 70a on the basis of notified information. Regarding touch-move, the moving direction of the finger or stylus pen moving on the touch panel 70a can also be determined for each vertical component and horizontal component on the touch panel 70a on the basis of a change in position coordinates. When it is detected that touch-move of a predetermined distance or more has been performed, it is determined that a slide operation has been performed. An operation of quickly moving a finger by a certain distance with the finger touched on the touch panel and then releasing the finger is called a flick. The flick is, in other words, an operation of quickly tracing the touch panel 70a like flicking the touch panel 70a with a finger. When it is detected that touch-move is performed for a predetermined distance or more at a predetermined speed or more, and touch-up is detected after that, it can be determined that a flick has been performed (it can be determined that a flick has been performed following a slide operation). Furthermore, a touch operation to touch a plurality of places (for example, two points) at the same time and to bring the touch positions closer to each other is referred to as pinch-in, and a touch operation to move the touch positions away from each other is referred to as pinch-out. Pinch-out and pinch-in are collectively referred to as a pinch operation (or simply pinch). As the touch panel 70a, any one of various methods of touch panel may be used, such as a resistive film method, a capacitive method, a surface acoustic wave method, an infrared method, an electromagnetic induction method, an image recognition method, and an optical sensor method. Depending on the method, one method detects that there is a touch by contact established with the touch panel, and another method detects that there is a touch by the approach of a finger or stylus pen to the touch panel. Either method may be used.

As the touch panel, any one of various methods of touch panel may be used, such as a resistive film method, a capacitive method, a surface acoustic wave method, an infrared method, an electromagnetic induction method, an image recognition method, and an optical sensor method.

When a still image capturing mode is set in the camera 100 by the mode selection switch 60, the system control unit 50 executes a still image capturing operation. In the still image capturing mode, when the shutter button 61 undergoes a half press operation, the first shutter switch signal SW1 is generated, and the system control unit 50 performs image capturing preparation processing (AF processing, AE processing, AWB processing, EF processing, and the like). Then, when the shutter button 61 undergoes a full press operation, the second shutter switch signal SW2 is generated, and the system control unit 50 executes still image capturing processing. In the still image capturing processing, the signal obtained by the image capturing by the image capturing unit 22 is converted into digital data (image data) by the A/D converter 23, the image processing unit 24 performs image processing for a still image, and the image data is written into the memory 32.

Then, the system control unit 50 generates an image file such as Joint Photographic Experts Group (JPEG) from the image data written into the memory, and records the image file in the recording medium 200 via the recording medium I/F 18. When the full press operation of the shutter button 61 is continued, a continuous image capturing mode is set. The still image capturing processing is repeatedly executed until the full press operation of the shutter button 61 is released, and a plurality of images (serial image) is continuously captured and recorded.

In a case where the moving image capturing mode is set, when the moving image recording button of the operation unit 70 is operated and a moving image capturing start instruction is input, the system control unit 50 starts moving image capturing processing. The moving image capturing processing is continued until the moving image recording button is operated again to input a moving image capturing termination instruction. Instead of using the moving image recording button, another button may be used to input the moving image capturing start instruction or the moving image capturing termination instruction. In the moving image capturing processing, continuous image capturing is performed at a frame rate set by the image capturing unit 22. The signal obtained by the image capturing is converted into digital data by the A/D converter 23 to obtain a serial image, that is, moving image data. The obtained moving image data undergoes moving image processing by the image processing unit 24 and is written into the memory 32. Then, the system control unit 50 performs recording control to generate a moving image file such as MPEG from a plurality of serial image data (moving image data) written into the memory and to record the moving image file in the recording medium 200 via the recording medium I/F 18. In the recording processing of the moving image file, the moving image file is created and recorded sequentially from the processed moving image data without waiting for the completion of the image capturing of the moving image or the completion of the moving image file. After the recording of the moving image data is completed, information necessary as the moving image file is recorded, and the recording processing of the moving image file is completed.

Figure 3:
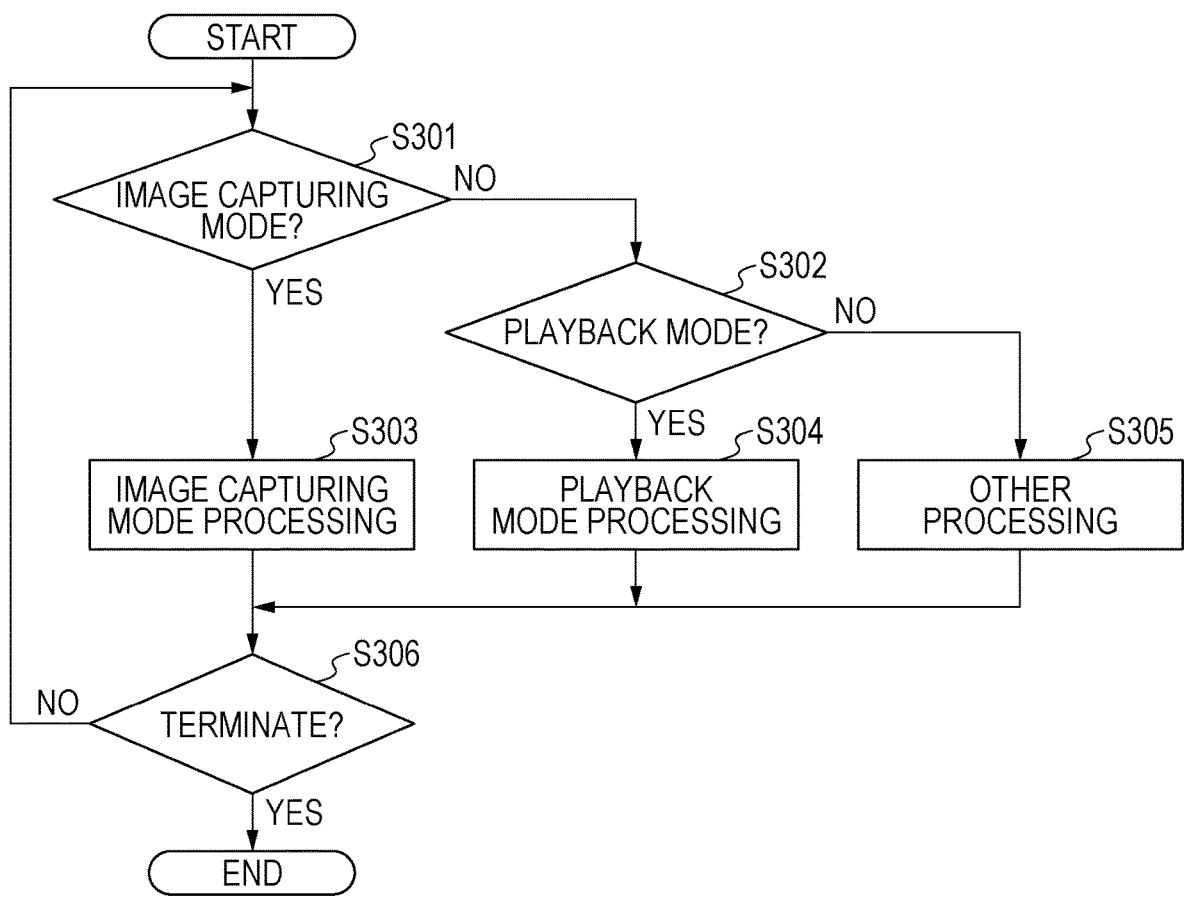
FIG. 3 is a diagram showing a basic flow from start up to termination of a digital camera.

FIG. 3 is a flowchart showing a basic flow from start up to termination of the digital camera.

After the camera starts up, the process proceeds to S301. In S301, it is determined whether the operation mode of the system control unit 50 is the image capturing mode on the basis of the position of the mode selection switch 60. When it is determined that the operation mode is the image capturing mode, the process proceeds to S303. When it is determined that the operation mode is not the image capturing mode, the process proceeds to S302. In S302, it is determined whether the operation mode of the system control unit 50 is the playback mode on the basis of the position of the mode selection switch 60. When it is determined that the operation mode is the playback mode, the process proceeds to S304. When it is determined that the operation mode is not the playback mode, the process proceeds to S305. In S303, processing of the image capturing mode is performed. The processing of the image capturing mode mentioned here includes still image capturing and moving image capturing. In S304, processing of the playback mode is performed. In the playback mode processing, mainly the still image or moving image captured and recorded in the recording medium 200 can be browsed, erased, or edited. The present disclosure allows the user to browse the moving image recorded in the recording medium 200 by displaying the moving image on the display unit 28. Then, the user can erase or edit the displayed image by performing the operation of erasing or editing the image. The processing for editing a moving image "moving image editing processing" will be described in detail later. In S305, other processing is performed. The other processing mentioned here includes processing in a clock display mode that only displays current time. When each mode processing is terminated, the process proceeds to S306, and it is determined whether to shut down the camera operation. When it is determined that the camera operation is to be shut down, the camera operation is terminated. Otherwise, the process proceeds to S301.

The moving image editing processing will be described with reference to FIGS. 4-1 to 4-6 to 9.

First, moving image playback processing, which is preceding processing of the moving image editing processing, and a screen transition from the moving image playback processing to the moving image editing processing will be described with reference to FIGS. 4-1 to 4-6.

Figures 1, 4:
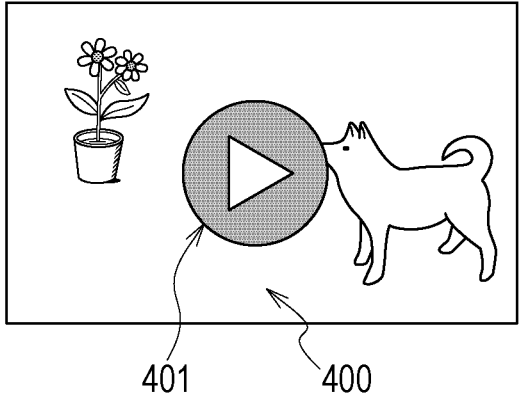
Figures 2, 4:
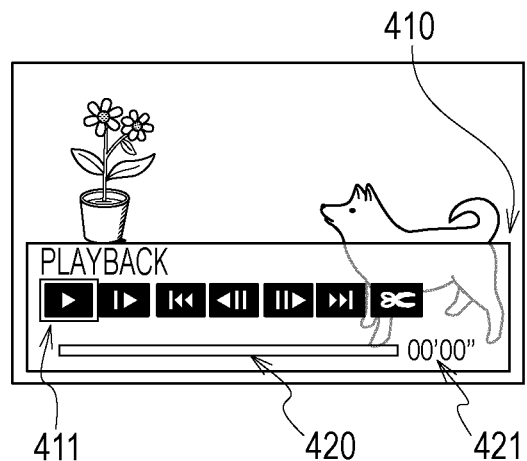
Figures 3, 4:
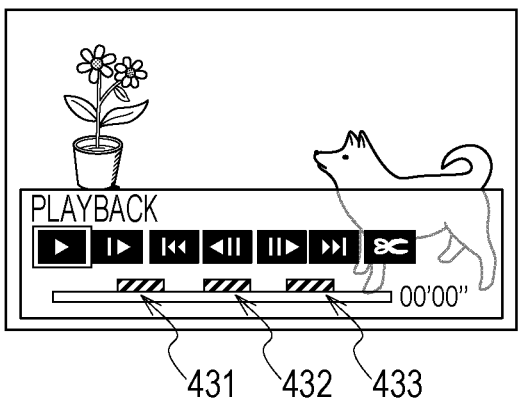
Figure 4:
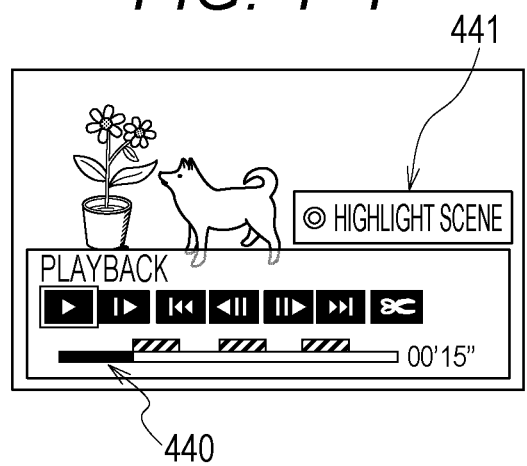

FIGS. 4-1 to 4-6 are views show a screen transition in the moving image playback processing. First, the system control unit 50 of a video editing apparatus reads a moving image file from the recording medium 200, performs decoding processing on the moving image file in the system control unit 50, and displays a first frame 400 of the moving image file on the display unit 28. At this time, an icon 401 for causing the moving image to be continuously played back is displayed at the center of the display unit 28. When the inside of the icon is touched and pressed by using the touch panel 70a or the SET button 145 of the operation unit 70 is pressed, continuous playback of the moving image starts (FIG. 4-1). Here, instead of starting continuous playback of the moving image, a menu for moving image playback (moving image playback panel 410) may be displayed as shown in FIG. 4-2 to allow selection of functions other than continuous playback of the moving image. The present exemplary embodiment describes an example to display the moving image playback panel 410. In the moving image playback panel 410, a continuous playback button, a slow playback button, a predetermined seconds skip reverse button, a one frame reverse button, a one frame forward button, a predetermined seconds skip forward button, and a moving image editing button are arranged in this order from the left. In FIG. 4-2, since the position of the cursor 411 is on the continuous playback button, when a press of the SET button 145 is received, the moving image playback panel 410 is hidden and the continuous playback of the moving image starts. In addition, a progress bar 420 is displayed to indicate which position of the entire moving image file the frame displayed on the display unit 28 indicates, and a display obtained by converting the displayed frame into time (time display 421) is displayed.

The system control unit 50 can analyze the entire moving image file and determine a climax of the moving image, that is, a highlight scene of the moving image. The climax of the moving image mentioned here is a specified section with predetermined characteristics, such as a scene in which a main subject has characteristic motion, and a scene when the main subject is a person and is facing forward for a long time. By analyzing metadata of each frame (subject information or the like) and video data or audio data of the moving image recorded in the moving image file, the system control unit 50 can determine such a specified scene as a climax. Such a climax is called a "highlight scene." In addition, it is possible to display near the progress bar 420 where the time zone of the highlight scene exists. In the present exemplary embodiment, as shown in FIG. 4-3, highlight scenes 431, 432, and 433 are displayed above the progress bar 420. For example, it is analyzed that the displayed moving image is a moving image with a total length of 70 seconds, and that the first climax section is between 15 seconds and 25 seconds. Therefore, the highlight scene 431 is displayed above the corresponding progress bar 420. Similarly, it is analyzed that the second climax section is between 30 seconds and 40 seconds and that the third climax section is between 45 seconds and 55 seconds. Therefore, the highlight scenes 432 and 433 are displayed above the corresponding progress bar 420.

In the present exemplary embodiment, it is possible to perform a skip operation of a highlight scene, and a member that performs the skip operation of a highlight scene is the controller wheel 73. When the skip operation of a highlight scene is received by using the controller wheel 73, a skip occurs to a frame that is a boundary position of the highlight scene section, that is, to the head frame or the last frame of the highlight scene. When the controller the 173 is rotated to the right by one click in the state of FIG. 4-2, a skip to the head frame of the next highlight scene occurs. The screen immediately after the skip operation is shown in FIG. 4-4. Since the skip to the head frame of the next highlight scene has occurred, the progress of the progress bar 420 is set at the position of 440. In addition, the skip to the head frame of the first highlight scene has occurred, the time display 421 is updated to 15 seconds, and a guidance 441 is displayed on the display unit 28 for a predetermined time to clearly show that the skip to the highlight scene has occurred. Further rotation of the controller wheel 73 to the right by one click leads to the state of FIG. 4-5, the time display 421 is updated to 30 seconds, and similarly, the guidance 441 is displayed on the display unit 28.

Figures 4, 5:
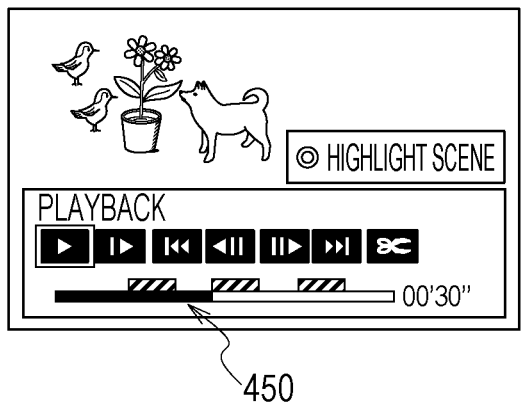
Figures 4, 5, 6:
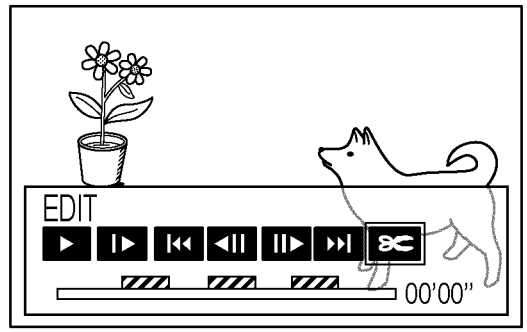
Figures 1, 5:
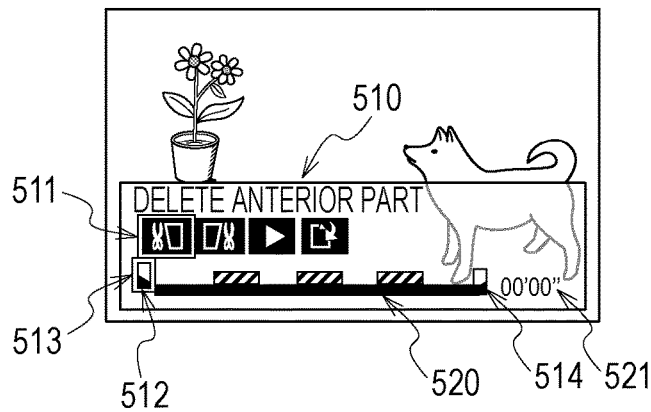
Figures 2, 5:
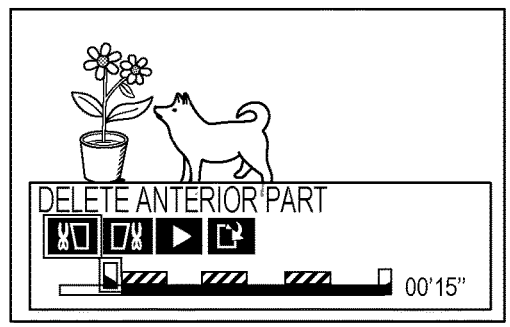
Figures 3, 5:
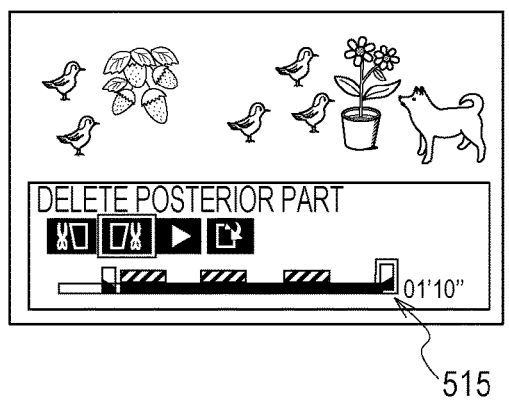
Figures 4, 5:
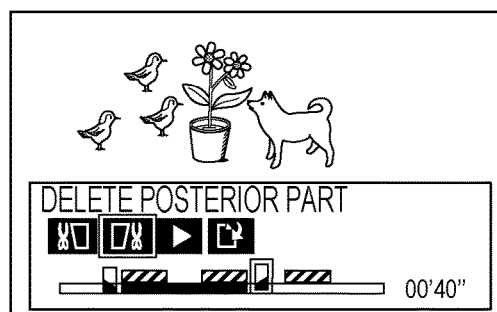
Figure 5:
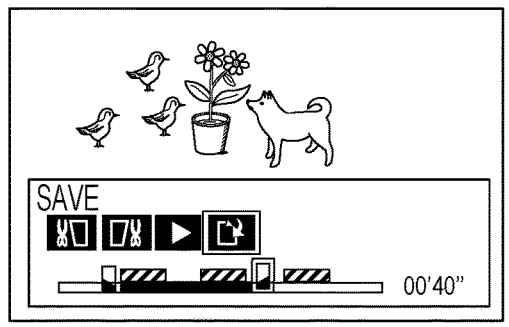
Figure 6:
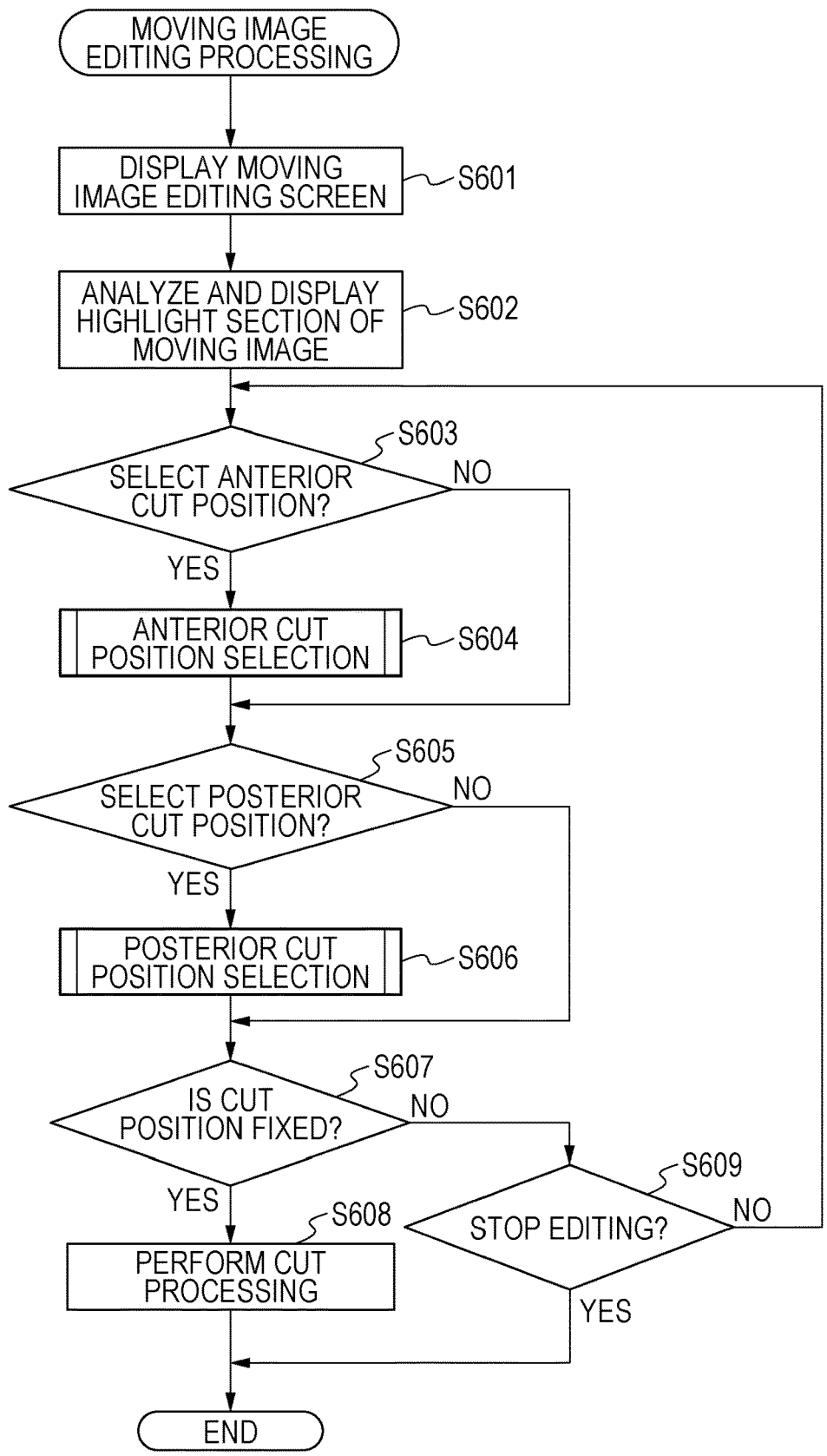

FIG. 4-6 is a view showing a state in which a moving image editing function is focused by operating the operation unit 70 while the moving image playback panel 410 is displayed. Pressing the SET button 145 in this state leads to a transition to a state of a moving image editing screen described later.

Next, the moving image editing processing, which is the main processing of the present exemplary embodiment, and in particular, the skip operation in the moving image editing screen will be described with reference to FIGS. 5-1 to 5-5 to 9.

Figure 7:
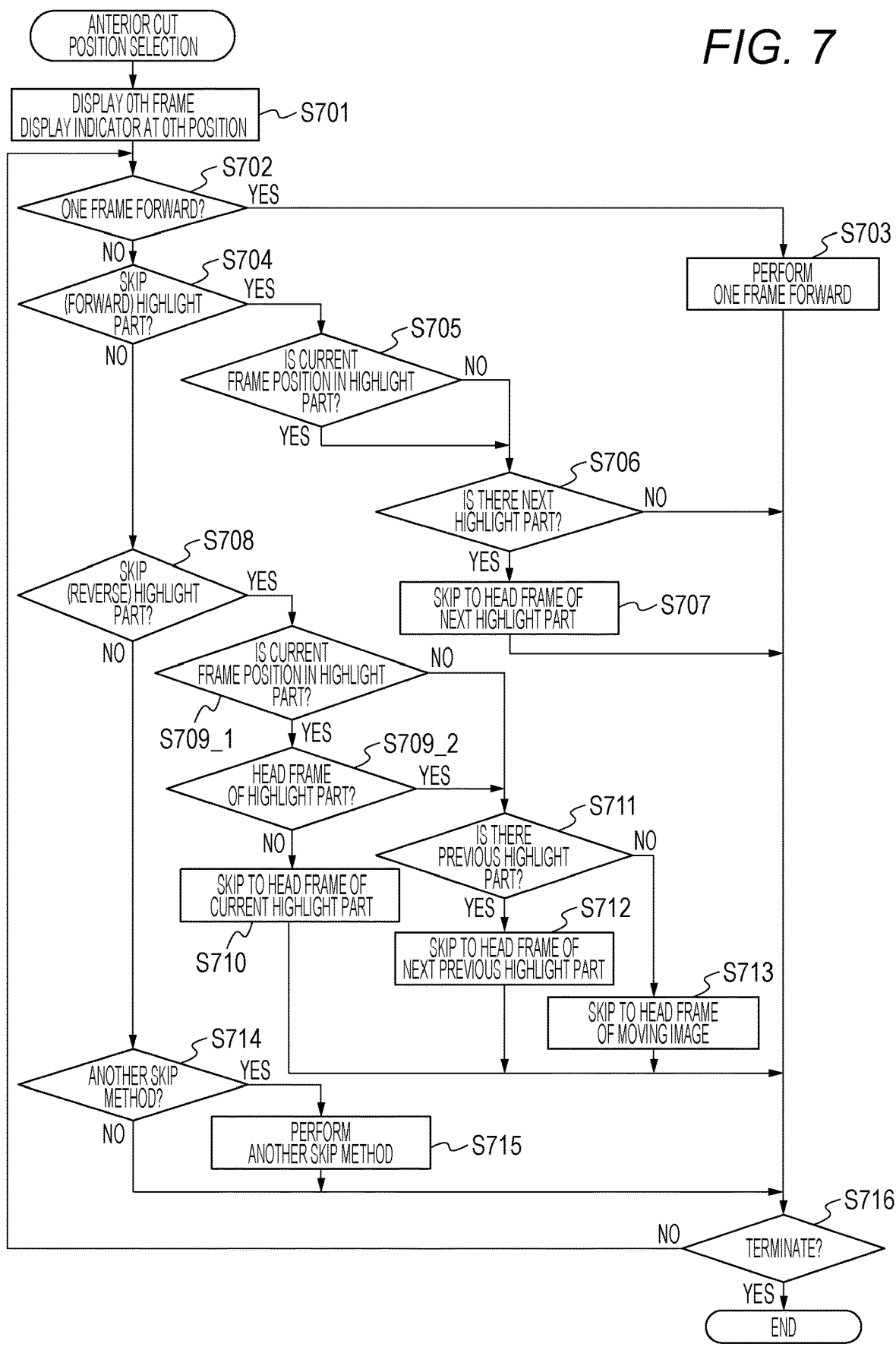
FIG. 7 is a diagram showing a flow when selecting an anterior cut position of moving image editing.
Figure 8:
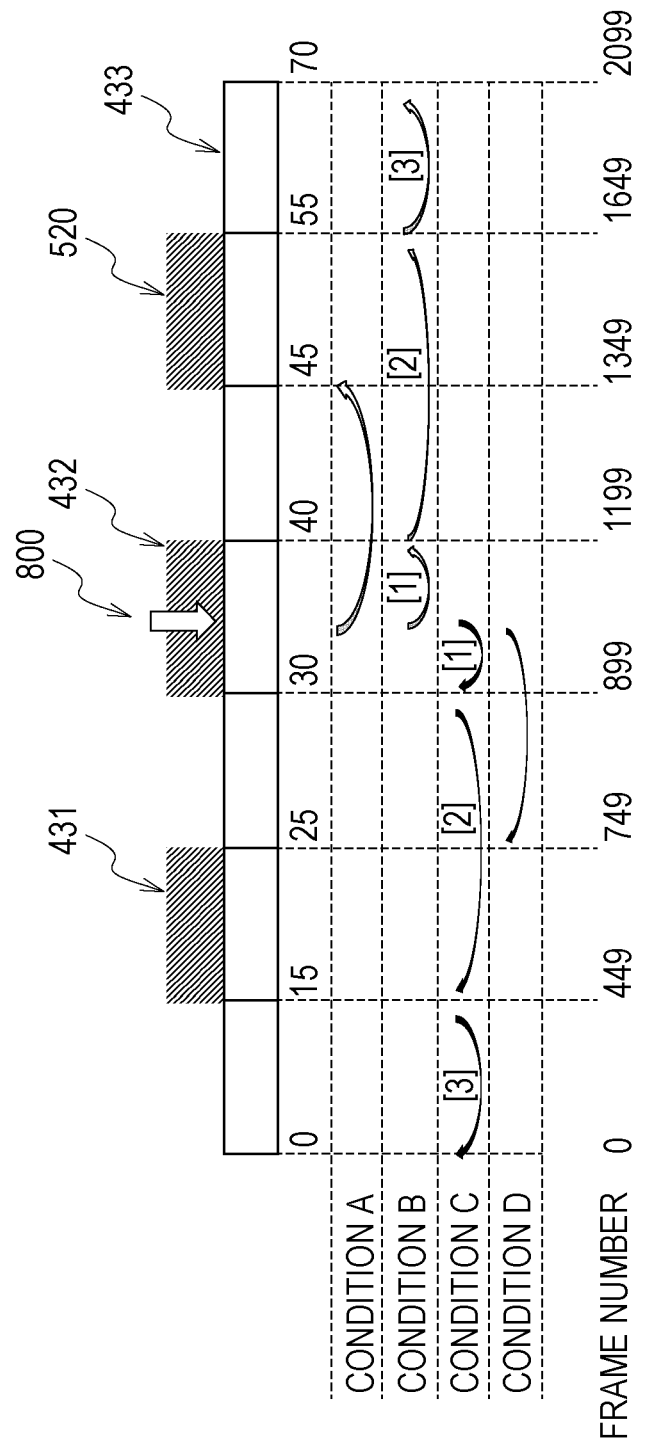
FIG. 8 is a diagram showing skip processing when editing a moving image.

FIGS. 5-1 to 5-5 are views showing a screen transition related to the moving image editing processing. FIG. 6 is a flowchart of the moving image editing processing. FIGS. 7 to 9 are flowcharts and diagrams showing the skip processing in the moving image editing screen.

Note that each processing in the flowcharts is implemented by the system control unit 50 unfolding the program stored in the non-volatile memory 56 into the memory 32 and executing the program.

In S601, after the moving image editing is selected in the preceding moving image playback panel, the system control unit 50 displays the moving image editing screen. FIG. 5-1 shows the moving image editing screen.

In the moving image editing screen, a moving image editing menu (moving image editing panel 510) is displayed on the display unit 28, in a similar manner to the moving image playback panel. Here, the moving image editing panel will be described in the moving image editing panel, an anterior cut button, a posterior cut button, a playback confirmation button, and a save execution button are arranged in this order from the left. When a button is selected, processing associated with the selected button is executed. The anterior for cut button is a button for calling processing to select a starting point frame for moving image editing. The posterior cut button is a button for calling processing to select an end point frame for moving image editing. The playback confirmation button is a button for performing preview before saving to perform continuous playback from the starting point to the end point. The save execution button is a button for saving a moving image from the starting point to the end point.

Moving a cursor 511 by using the operation unit and pressing the SET button 145 while the anterior cut button is selected will lead to a starting point selection state as shown in FIG. 5-1. At this time, in a similar manner to the progress bar for moving image playback described above, a progress bar 520 for editing is also displayed on the moving image editing screen. In addition, a starting point 512 and an end point 514 are disposed on both sides of the progress bar. Since the anterior cut position is designated here, marking like 513 is made to indicate that the starting point 512 is focused. In other words, by pressing the left or right button in this state, it is possible to move the starting point position by one frame. As described above, it is also possible to perform the skip operation of a highlight scene. The display of a highlight scene will be described later in S602. Then, the process proceeds to S602.

In S602, the system control unit 50 analyzes the highlight scene of the moving image displayed on the display unit 28, and displays a result of the analysis above the progress bar 520. If the target moving image (moving image file displayed) is the same, the highlight scene of the entire moving image is the same, and thus the result analyzed in FIG. 4-3 described above may be used here. Alternatively, only the highlight scene analysis processing may be performed at the time of FIG. 4-3, and only the display may be performed in this step. Then, the process proceeds to S603.

In S603, the system control unit 50 determines whether the anterior cut button in the moving image editing panel described above has been selected. When the anterior cut button has been selected, the process proceeds to S604, and proceeds to anterior cut position selection processing. When the anterior cut button has not been selected, the process proceeds to S605, When the anterior cut button has been selected, a focus state 513 is set at the starting point 512 indicating the anterior cut position as shown in FIG. 5-1. In the anterior cut position selection processing, the starting point 512 indicating the anterior cut position can be designated by changing the playback position (selection position) in the moving image in response to the user operation. Details of the anterior cut position selection processing will be described later. Then, the process proceeds to S605.

In S605, the system control unit 50 determines whether the posterior cut button in the moving image editing panel described above has been selected. When the posterior cut button has been selected, the process proceeds to S606, and proceeds to posterior cut position selection processing. When the posterior cut button has not been selected, the process proceeds to S607. When the posterior cut button is selected, a focus state 515 is displayed at the end point 514 indicating the posterior cut position as shown in FIG. 5-3. In the posterior cut position selection processing, the end point 514 indicating the posterior cut position can be designated by changing the playback position (selection position) in the moving image in response to the user operation. Details of the posterior cut position selection processing will be described later. Then, the process proceeds to S607.

In S607, the system control unit 50 determines whether the save execution button has been pressed. That is, the system control unit 50 determines whether the starting point and the end point are selected in the above-described steps, and whether the save execution button in the moving image editing panel 510 is pressed by the user operation using the operation unit 70. See FIG. 5-5. When the save execution button has been pressed, the process proceeds to S608. Otherwise, the process proceeds to S609.

In S608, the system control unit 50 performs the moving image editing processing at positions of the starting point selected in S604 and the end point selected in S606, and saves the edited moving image into the recording medium 200. In this moving image editing processing, the moving image is saved after deleting the moving image of the designated cut-out section of anterior cut from the head position of the moving image to the starting point position selected by the user in S604, and deleting the moving image of the designated cut-out section of posterior cut from the end point position selected by the user in S606 to the rear end position of the moving image. That is, the moving image from the starting point position to the end point position selected by the user excluding the moving image in the designated section is saved in the recording medium 200. The edited moving image may be overwritten on the recorded moving image or may be newly saved. Then the moving image editing processing is terminated.

In S609, the system control unit 50 determines whether the button for stopping the moving image editing has been pressed. When the button for stopping the moving image editing is pressed, the moving image editing processing is terminated. Otherwise, the process returns to S603.

Next, in FIG. 7, anterior cut position selection processing will be described with reference to the flowchart. In the anterior cut position selection processing, the position of the starting point 512 can be changed to the selection position selected by the user operation.

Upon entering the anterior cut position selection processing, first, in S701, the system control unit 50 displays, on the display unit 28, the head frame of the moving image to undergo moving image editing (frame of 0 minutes 0 seconds or 0th frame: 0 origin). Furthermore, the system control unit 50 displays the position of the starting point 512 of the progress bar displayed on the moving image editing panel 510 at the 0th position (left end of the progress bar). Then, the process proceeds to S702.

In S702, the system control unit 50 determines whether an operation event of one frame forward has been received. In the present exemplary embodiment, the system control unit 50 determines whether the right button of the operation unit 70 has been pressed in the state of FIG. 5-1 and an operation event of one frame forward has been received. When the operation event of one frame forward has been received, the process proceeds to S703. Otherwise, the process proceeds to S704.

In S703, the system control unit 50 performs the processing of one frame forward. One frame forward means that if the target moving image is 30 fps, for example, the moving image is put forward by 1/30 seconds. As described above, in the exemplary embodiment, since the entire length of the moving image is 70 seconds, the total number of frames is 2099 (because of 0 origin), and the first frame is displayed. Since time display 521 is updated in units of second, "00'00"" is still displayed. In S702 and S703, putting forward by one frame has been described. Meanwhile, when the left button of the operation unit 70 is operated in S702 and a one frame reverse event for returning one frame is received, processing of returning one frame may be performed in S703. When the processing is terminated, the process proceeds to S716.

In S704, the system control unit 50 determines whether a skip (forward) operation event of a highlight scene (moving operation to the next highlight scene) has been received. The skip operation event mentioned here is a determination as to whether the controller wheel of the operation unit 70 has been moved to the right by one click as described in FIGS. 4-1 to 4-6. When the skip (forward) operation event has been received, the process proceeds to S705. Otherwise, the process proceeds to S708.

In S705, the system control unit 50 determines whether the display frame of the moving image displayed on the display unit 28 is one frame of an arbitrary highlight scene. That is, the system control unit 50 determines whether the currently selected frame position (that is, playback position) is within a specified section of a highlight scene. When it is determined that the frame position is one frame of the highlight scene, the process proceeds to S706. Otherwise, the process also proceeds to S706. S705 is originally an unnecessary step, but is described for convenience's sake because there are places where similar determination is made in the following description.

In S706, the system control unit 50 determines whether a highlight scene exists in the forward direction with respect to the currently selected frame position displayed on the display unit 28. When a highlight scene exists in the forward direction, the process proceeds to S707. Otherwise, the process proceeds to S716.

In S707, since a highlight scene exists in the forward direction, the system control unit 50 performs processing to skip from the current frame position to the head frame of the next highlight scene. That is, the system control unit 50 performs processing to move the selection position (playback position) to the head of the next highlight scene and to display the frame corresponding to the moved selection position (head frame of the next highlight scene). The processing of S707 is shown in the screen transition diagram from FIG. 5-1 to FIG. 5-2. That is, the starting point 512 is moved from the current frame position (0 seconds: 0th) to the position of the head frame of the next highlight scene 431 (15 seconds: 449th), and then the frame is displayed on the display unit 28 (see the skip processing of condition A of FIG. 8 described later). Then, the process proceeds to S716. Note that when the skip operation of a highlight scene is received twice in S706, processing of skipping to the head frame of the highlight scene 431 and then to the head frame of the next highlight scene 432 is performed.

On the other hand, when it is determined in S706 that no highlight scene exists in the forward direction, the skip processing is not performed and the selection position is not moved from the currently selected frame position.

In S708, the system control unit 50 determines whether the skip (reverse) operation event of a highlight scene (moving operation to the previous highlight scene) has been received. The skip operation event mentioned here is a determination as to whether the controller wheel of the operation unit 70 has been moved to the left by one click as described in FIGS. 4-1 to 4-6. When the skip (reverse) event has been received, the process proceeds to S709_1. Otherwise, the process proceeds to S714.

In S709_1, the system control unit 50 determines whether the display frame of the moving image displayed on the display unit 28 is one frame of an arbitrary highlight scene, in a similar manner to S705 described above. When it is determined that the displayed frame is one frame of a highlight scene and the current selection position is within a specified section of a highlight scene, the process proceeds to S709_2. Otherwise, the process proceeds to S711. In S709_2, the system control unit 50 determines whether the frame of the moving image displayed on the display unit 28 is the head frame of the highlight scene. That is, the system control unit 50 determines whether the current selection position (playback position) in the moving image is the head of the specified section that is a highlight scene. When it is determined that the current selection position is the head frame, the process proceeds to S711. Otherwise, the process proceeds to S710.

In S710, the system control unit 50 performs processing to skip to the head frame of the highlight scene section including the frame currently displayed on the display unit 28. That is, the system control unit 50 performs processing to move the selection position to the head frame of the highlight scene section including the current selection position. This means that when the current frame displayed on the display unit 28 is an arbitrary frame in the highlight scene 432 described above, a skip occurs to the head frame of the highlight scene 432. Then, the process proceeds to S716 (see the skip processing of condition C-[1] of FIG. 8 described later).

In S711, the system control unit 50 determines whether a highlight scene exists in the reverse direction with respect to the current frame selection position displayed on the display unit 28, that is, forward of the selection position. When a highlight scene exists in the reverse direction, the process proceeds to S712. Otherwise, the process proceeds to S713.

In S712, the system control unit 50 performs processing to skip from the current frame position to the head frame of the highlight scene that exists in the reverse direction. That is, the system control unit 50 performs processing to move the selection position to the head frame of the highlight scene section that exists in the reverse direction from the current selection position, and to display the frame at the selection position on the display unit 28 (see the skip processing in condition C-[2] of FIG. 8 described later). Then, the process proceeds to S713.

In S713, the system control unit 50 performs processing to skip to the head frame (0th frame) of the moving image. That is, when the current selection position is before the head frame of the first highlight scene in the moving image, or before the first highlight scene, the system control unit 50 performs processing to move the selection position to the head of the moving image and display the head frame of the moving image on the display unit 28 (see the skip processing in condition C-[3] of FIG. 8 described later). Then, the process proceeds to S716.

In this way, in the anterior cut position selection processing, in the skip (forward) operation event of the highlight scene, when the next highlight scene does not exist (No in S706), the system control unit 50 does not change the selection position. In the skip (reverse) operation event of the highlight scene, when no highlight scene exists before (No in S711), the system control unit 50 moves the selection position to the head frame of the moving image (S713). That is, in the anterior cut position selection processing, it is possible to move to the head frame of the moving image by the skip operation of the highlight scene, but it is not possible to move to the last frame of the moving image. Since the last frame of the moving image is not selected as the starting point, it is not possible to move to the last frame of the moving image by the skip operation of the highlight scene.

In S714, the system control unit 50 makes a determination as to whether frame forward processing such as S702, S704, S708 or another skip operation event other than the skip processing has been received. When another skip operation event has been received, the process proceeds to S715. Otherwise, the process proceeds to S716. Another skip operation event refers to events received by operation on operation members other than the left and right buttons and the controller wheel of the operation unit 70. Examples of another skip operation event cl d a skip operation method in units of chapter, or a skip operation method in units of the predetermined number of frames or the number of images. If chapter information is embedded in the moving image in advance, it is possible to skip the frame to be displayed on basis of the information.

In S715, the system control unit 50 performs another skip processing. As described above, here, the skip processing in units of chapter or the skip processing in units of the predetermined number of frames or the predetermined number of images is performed. If the skip operation in units of chapter is received but the moving image does not contain chapter information, processing to skip for a predetermined number of seconds (predetermined number of frames or predetermined number of images) may be performed. Then, the process proceeds to S716.

In S716, it is determined whether to terminate the anterior cut position selection. When terminating the anterior cut position selection, the current selection position is designated as the starting point 512, frames from the head of the moving image to this designated position (starting point 512) is set to be cut and deleted, and the anterior cut position selection processing is terminated. When the anterior cut position selection processing is not terminated, the process returns to S702.

Following the anterior cut processing, the posterior cut position selection processing will be described with reference to the flowchart of FIG. 9. In the posterior cut position selection processing, the position of the end point 514 can be changed to the selection position selected by the user operation.

Upon entering the posterior cut position selection processing, first, in S901, the system control unit 50 displays, on the display unit 28, the last frame of the moving image to undergo moving image editing (frame of 70 seconds or 2099th frame: 0 origin). Furthermore, the system control unit 50 displays the position of the end point 514 of the progress bar displayed on the moving image editing panel 510 at the 2099th position (right end of the progress bar). Then, the process proceeds to S902.

In S902, the system control unit 50 determines whether an operation event of one frame forward has been received. In the present exemplary embodiment, the system control unit 50 determines whether the right button of the operation unit 70 has been pressed in the state of FIG. 5-3. When the operation event of one frame forward has been received, the process proceeds to S903. Otherwise, the process proceeds to S904.

In S903, the system control unit 50 performs the processing of one frame forward. Details of the processing are alike the processing of S703 described above, and thus redundant description thereof will be omitted. In a similar manner to S702 and S703, when the left button of the operation unit 70 is operated and the event of one frame reverse for returning one frame has been received in S902, processing to return one frame is performed in S903. When the processing is terminated, the process proceeds to S916.

In S904, the system control unit 50 determines whether a skip (forward) operation event of a highlight scene has been received. This is similar to the processing of S704. When the skip (forward) operation event has been received, the process proceeds to S905_1. Otherwise, the process proceeds to S908.

In S905_1, the operation of the system control unit 50 is alike the operation of S705 and S709_1 described above, and thus redundant description thereof will be omitted. When it is determined that the frame at the current selection position (playback position) is one frame in the highlight scene section, the process proceeds to S905_2. Otherwise, the process proceeds to S907.

S905_2, the system control unit 50 determines whether the frame of the moving image displayed on the display unit 28 is the last frame of the highlight scene. That is, the system control unit 50 determines whether the current selection position in the moving image is the rear end of the specified section that is the highlight scene. When it is determined that the frame of the moving image displayed on the display unit 28 is the last frame, the process proceeds to S907. Otherwise, the process proceeds to S906.

In S906, the system control unit 50 performs processing to skip to the last frame of the highlight scene section including the frame currently displayed on the display unit 28. That is, the system control unit 50 performs processing to move the selection position to the last frame that is the rear end of the highlight scene section including the current selection position. This means, when the current frame displayed on the display unit 28 is an arbitrary frame in the highlight scene 432 described above, to skip to the last frame of the highlight scene 432. Then, the process proceeds to S916 (see the skip processing of condition B-[1] of FIG. 8).

In S907, the system control unit 50 determines whether a next highlight scene exists in the forward direction of the current frame selection position displayed on the display unit 28, that is, in the backward direction of the selection position. When a highlight scene exists in the forward direction, the process proceeds to S908. Otherwise, the process proceeds to S909.

In S908, the system control unit 50 performs processing to skip to the last frame of the next highlight scene that exists in the forward direction of the current frame position. That is, the system control unit 50 performs processing to move the selection position to the head of the next highlight scene section that exists in the forward direction of the current selection position, and to display the head frame of the next highlight scene section on the display unit 28 (see the skip processing in condition B-[2] of FIG. 8). Then, the process proceeds to S916.

In S909, the system control unit 50 performs processing to skip to the last frame of the moving image (2099th frame). That is, when the current selection position is the last frame of the last highlight scene in the moving image or backward of the last highlight scene, the system control unit 50 performs processing to move the selection position to the rear end of the moving image, and to display the last frame, which is the rear end of the moving image, on the display unit 28 (see the skip processing of condition B-[3] of FIG. 8). Then, the process proceeds to S916.

In S910, the system control unit 50 determines whether a skip (reverse) operation event of a highlight scene has been received. This is similar to the processing of S708 described above. When the skip (reverse) operation event has been received, the process proceeds to S911. Otherwise, the process proceeds to S912.

S911 is alike S705, S7091, and S905_1 described above, and thus redundant description thereof will be omitted. When it is determined that the current selection position is in the highlight scene section and that the displayed frame is one frame of the highlight scene, the process proceeds to S912. Otherwise, the process also proceeds to S912.

In S912, the system control unit 50 determines whether a highlight scene exists in the reverse direction from the currently selected frame position (playback position) displayed on the display unit 28. When a highlight scene exists in the reverse direction, the process proceeds to S913. Otherwise, the process proceeds to S916.

In S913, since a highlight scene exists in the reverse direction, the system control unit 50 performs processing to skip from the currently selected frame position to the last frame of the next previous highlight scene that exists in the reverse direction. That is, the system control unit 50 performs processing to move the selection position (playback position) to the rear end of the next previous highlight scene section, and to display a frame corresponding to the selection position after the movement (last frame of the next previous highlight scene). The processing here is to move the end point 514 from the current frame position (70 seconds: 2099th) to the position of the last frame of the next previous highlight scene 433 (55 seconds: 1649th), and to display the frame on the display unit 28 (see the skip processing in condition D of FIG. 8). Then, the process proceeds to S916. Note that when the skip operation of a highlight scene is received twice in S910, for example, as shown in the screen transition diagram from FIG. 5-3 to FIG. 5-4, processing such as skipping to the last frame of the highlight scene 433 and to the last frame of the next highlight scene 432 is performed.

On the other hand, when it is determined in S912 that no highlight scene exists in the reverse direction, the system control unit 50 does not perform the skip processing and does not move the selection position from the currently selected frame position.

In this way, in the posterior cut position selection processing, in the skip (forward) operation event of the highlight scene, when the next highlight scene does not exist (No in S907), the selection position is changed to the last frame of the moving image. In the skip (reverse) operation event of the highlight scene, when no highlight scene exists before (No in S912), the selection position is not moved. That is, in the posterior cut position selection processing, it is possible to move to the last frame of the moving image by the skip operation of the highlight scene, but it is not possible to move to the head frame of the moving image. Since the head frame of the moving image is not selected as the end point, it is not possible to move to the head frame of the moving image by the skip operation of the highlight scene.

The processing from S914 to S916 is alike the processing from S714 to S716 described above, and thus redundant description thereof will be omitted. Then, the posterior position selection processing is terminated.

The moving image editing in the present exemplary embodiments to designate the position to edit (part to be left as a moving image file) as shown in FIG. 5-5. It is required that the starting point 512 and the end point 514 can be quickly designated. it is highly likely that the highlight scene detected in the moving image is included in the part to be left as a moving image file. As described in S702, S703, S902, and S903, it is possible to designate the starting point 512 and the end point 514 by moving one frame at a time, but it is not realistic to designate a moving image that is captured for a long time by moving one frame at a time. Therefore, it is considered to use a skip operation for a moving image in which highlight scenes have been detected. For example, as shown in FIG. 5-5, in order to perform editing such that the highlight scenes 431 and 432 are included, it is necessary to set the starting point at the head frame of 431 and to move the end point to the last frame of 432. Regarding the movement of the starting point, rotating the controller wheel 73 in the forward direction will cause the starting point to skip to the head frame of the next highlight scene, resulting in little operational difficulty. However, if the same skip rule is applied to the movement of the end point, the operability will decrease. Specific examples when the same rule is applied are given below. The initial position when selecting the end point is the last frame of the moving image (see FIG. 5-3). Rotating the controller wheel 73 from here in the reverse direction (left rotation) will cause the end point to skip to the head frame of the next previous highlight scene if the same rule is applied (at this time, position of 45 seconds shown in FIG. 8). Further rotating the wheel to the left will cause the end point to skip to the head frame of the next previous highlight scene (at this time, position of 30 seconds shown in FIG. 8). Since the purpose is to designate the ranges of 431 and 432, it is preferable to set the end point at the last frame of the highlight scene (position of 40 seconds shown in FIG. 8). That is, if the skip to the head frame continues, it is necessary to move the frame from the head frame to the last frame by another method. In contrast, as shown by the flowchart of FIG. 9, if the control is performed to skip the last frame of each highlight scene when posterior cut is designated, an operation to move from the head frame to the last frame by another method becomes unnecessary as described above. The present exemplary embodiment has described the moving image with a length of 70 seconds as an example, but the moving image to actually edit is likely to have a length longer than this example. Therefore, it is preferable to make the operation to designate the editing range as easy as possible such that editing can be completed with only the skipping processing (in addition, just fine adjustment of one frame forward).

Figure 9:
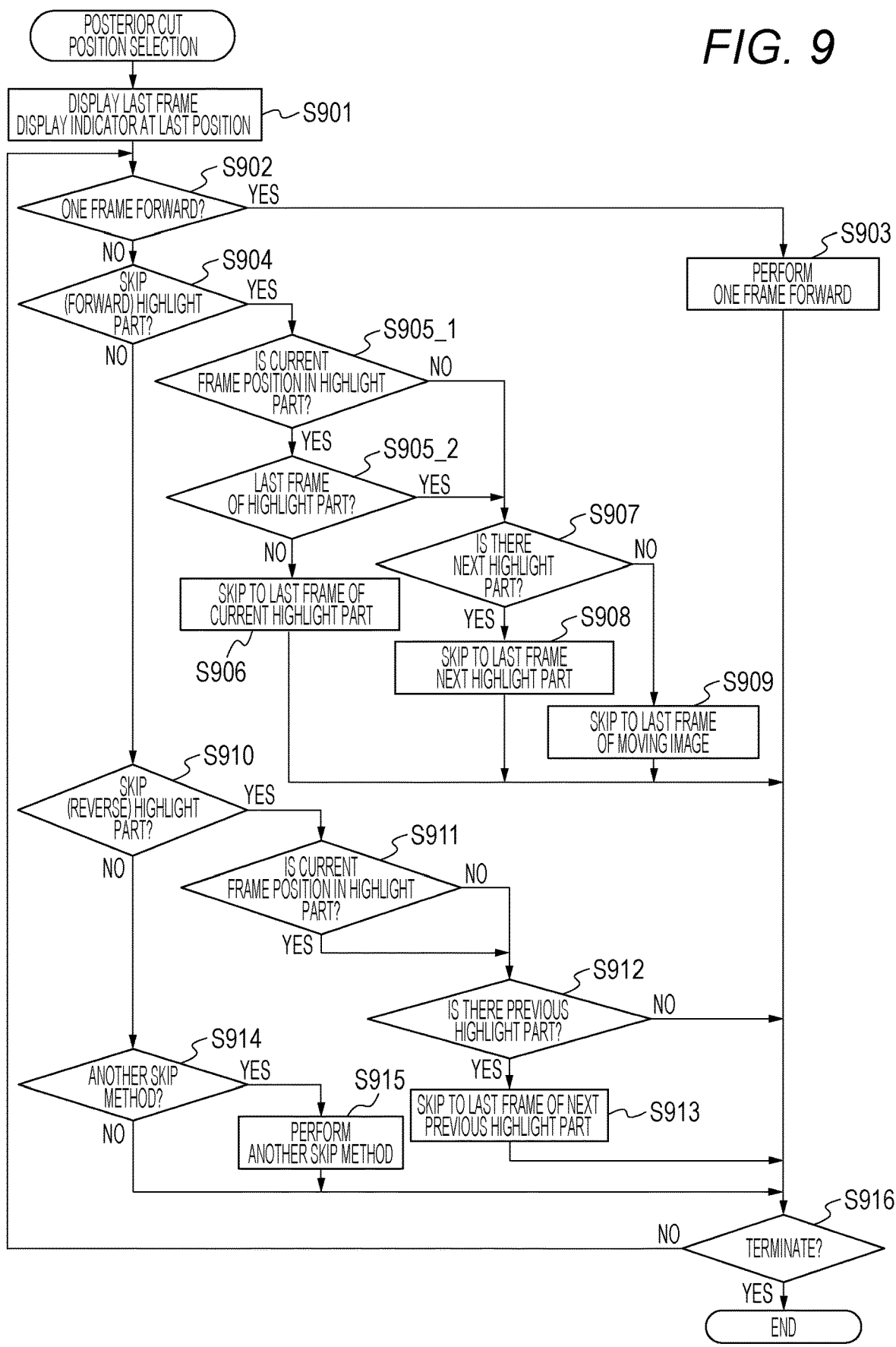
FIG. 9 is a diagram showing a flow when selecting a posterior cut position of moving image editing.

As described above, combining the starting point selection in FIG. 7 and the end point selection in FIG. 9 will bring an advantage of reducing the number of steps to designate the editing range during moving image editing.

Note that when performing the next/previous skip, it is necessary to ensure that the end point does not go beyond the starting point. Therefore, a determination as to whether the end point goes beyond the starting point may be added to steps including S706, S711, S907, and S912 described above. Adding this determination will result in a clear editing range.

In addition, the skip processing in the anterior cut position selection state shown in FIG. 7 may be applied not only to the moving image editing anterior cut position selection state but also to the moving image playback panel display state shown in FIG. 4-3 and the like. This is because it is more convenient to skip the head frame of the specified section during the moving image playback. For a user who feels it inconvenient to just skip the head frame of the specified section, processing to alternately skip the head frame of the specified section and the last frame of the specified section may be used. For example, as shown in FIG. 8, this is a method of skipping to positions such as 15 seconds, 25 seconds, 30 seconds, 40 seconds, every time an event of rotating the controller wheel 73 to the right is received. Such control will improve the operability of the skip operation in the moving image playback state.

In this way, by switching the moving destination of the selection position in response to the skip operation for moving the selection position according to the current processing mode (during moving image playback, selection of anterior cut position for moving image editing, selection of posterior cut position for moving image editing), it becomes possible to perform a comfortable skip operation during moving image playback. This makes it possible to implement a comfortable skip operation. In addition, by switching the moving destination of the selection position in response to the skip operation for moving the selection position according to the selection of anterior cut position for moving image editing and the selection of posterior cut position for moving image editing, an advantage of reducing the number of moving image editing steps is provided. That is, an effect that the number of operation steps is reduced is produced when the user cuts out and edits a designated section based on a designated position designated by moving the selection position in a long moving image.

Note that in the processing of the exemplary embodiment, a storage medium recording a program code of software embodying each function may be provided to a system or an apparatus. The above-described various controls described as being performed by the system or the computer of the apparatus may be performed by one piece of hardware, or a plurality of pieces of hardware (for example, a plurality of processors or circuits) may share the processing to control the entire apparatus.

The present disclosure has been described in detail on the basis of preferred exemplary embodiments. However, the present disclosure is not limited to the specified exemplary embodiments, and various modes without departing from the gist of the present disclosure are also included in the present disclosure. Furthermore, each exemplary embodiment described above is merely one exemplary embodiment of the present disclosure, and exemplary embodiments can be appropriately combined.

An above-described exemplary embodiment has been described by taking the case where the present disclosure is applied to a digital camera as an example, but this is not limited to this example. The present disclosure is applicable to a display control device that can display a plurality of images and receive touch input. That is, the present disclosure is applicable to personal computers, PDAs, mobile phone terminals, portable image viewers, printer apparatuses equipped with displays, digital photo frames, music players, game machines, electronic book readers, and the like.

In the above-described exemplary embodiments, the moving image editing processing has been described. However, the present disclosure may be applied not only to a moving image but also to editing of a continuous image of a still image captured in the continuous image capturing mode and recorded in the recording medium 200. The present disclosure is applicable to a serial image including a plurality of images captured continuously, such as a moving image and continuously captured images.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068851, filed Mar. 29, 2019, which is hereby incorporated by reference herein in entirety.

What is claimed is:

1. An image processing device comprising:
one or more processors; and
a memory storing instructions which, when the instructions are executed, cause one or more processors to function as:
an acquisition unit configured to acquire a serial image obtained by capturing a plurality of images continuously;
a determination unit configured to determine a specified section of the serial image; and
a control unit configured to move a selection position in response to a moving operation for moving the selection position in the serial image,
wherein in a first mode, the control unit performs control to move the selection position to a position corresponding to a head of the specified section in response to the moving operation, and in a second mode, the control unit performs control to move the selection position to a position corresponding to a rear end of the specified section in response to the moving operation,
wherein the moving operation includes a first moving operation to put forward the selection position to a boundary position of a next specified section, and a second moving operation to return the selection position to a boundary position of a previous specified section, and
wherein in the first mode, the control unit allows the selection position to be moved to a head of the serial image in response to the second moving operation, and the control unit prohibits the selection position from moving to a rear end of the serial image in response to the first moving operation.

2. The image processing device according to claim 1, wherein the first mode is a mode for selecting a designated position in the serial image in order to delete each of the images of a designated section from a head image of the serial image to an image corresponding to the designated position designated in response to a user operation, and
the second mode is a mode for selecting the designated position in the serial image in order to delete each of the images of a designated section from the image corresponding to the designated position designated in response to the user operation to a rear end image of the serial image.

3. The image processing device according to claim 2, further comprising an editing unit configured to save the serial image excluding each of the images of the designated section designated by the user operation.

4. The image processing device according to claim 1, wherein in a mode for playing the serial image, the control unit performs control to move the selection position to the position corresponding to the head of the specified section in response to the moving operation.

5. The image processing device according to claim 1, wherein the moving operation is an operation for moving the selection position to each of the images at a boundary position of the specified section.

6. The image processing device according to claim 5, further comprising: a first operation member configured to receive the moving operation; and a second operation member configured to receive an operation for moving the selection position in units of a predetermined number of images.

7. The image processing device according to claim 1, wherein in the first mode, the control unit performs control to move the selection position to the position corresponding to the head of the specified section in response to the first moving operation and the second moving operation, and in the second mode, the control unit performs control to move the selection position to the position corresponding to the rear end of the specified section in response to the first moving operation and the second moving operation.

8. The image processing device according to claim 7, wherein
in the first mode, in a case where the second moving operation is performed when the selection position is a position that is within a specified section and not at a head of the specified section, the control unit performs control to move the selection position to the head of the specified section, and
in the second mode, in a case where the first moving operation is performed when the selection position is a position that is within a specified section and not at a head of the specified section, the control unit performs control to move the selection position to the rear end of the specified section.

9. The image processing device according to claim 1, wherein in the first mode, when the selection position exists at a head of a first specified section or before the head of the first specified section in the serial image, the control unit performs control to move the selection position to the head of the serial image in response to the second moving operation.

10. The image processing device according to claim 1, wherein in the second mode, the control unit allows the selection position to be moved to a rear end of the serial image in response to the first moving operation, and the control unit prohibits the selection position from moving to an image of the rear end of the serial image in response to the second moving operation.

11. The image processing device according to claim 10, wherein in the second mode, when the selection position exists at a rear end of a last specified section or after the rear end of the last specified section in the serial image, the control unit performs control to move the selection position to the rear end of the serial image in response to the second moving operation.

12. The image processing device according to claim 1, wherein in a mode for playing the serial image, the control unit performs control to move the selection position to the position corresponding to the head of the specified section in response to the first moving operation and the second moving operation, and the control unit performs control to allow the selection position to be moved to a head image of the serial image in response to the second moving operation, and to prohibit the selection position from moving to a rear end image of the serial image in response to the first moving operation.

13. The image processing device according to claim 1, wherein the specified section is a section indicating a highlight scene of the serial image.

14. The image processing device according to claim 1, wherein the serial image is a moving image.

15. The image processing device according to claim 1, wherein the serial image is an image obtained by continuous image capturing.

16. The image processing device according to claim 1, further comprising an image capturing unit configured to capture the serial image.

17. A method of controlling an image processing device, the method comprising:
an acquisition step of acquiring a serial image obtained by capturing a plurality of images continuously;
a specifying step of specifying a specified section of the serial image; and
a control step of moving a selection position in response to a moving operation for moving the selection position in the serial image,
wherein the control step includes:
performing control to move the selection position to a position corresponding to a head of the specified section in response to the moving operation in a first mode; and
performing control to move the selection position to a position corresponding to a rear end of the specified section in response to the moving operation in a second mode,
wherein the moving operation includes a first moving operation to put forward the selection position to a boundary position of a next specified section, and a second moving operation to return the selection position to a boundary position of a previous specified section, and
wherein in the first mode, the control unit allows the selection position to be moved to a head of the serial image in response to the second moving operation, and the control unit prohibits the selection position from moving to a rear end of the serial image in response to the first moving operation.

18. A non-transitory computer-readable storage medium storing a program for causing a computer to execute the method of controlling the image processing device according to claim 17.

19. An image processing device comprising:
one or more processors; and
a memory storing instructions which, when the instructions are executed, cause one or more processors to function as:
an acquisition unit configured to acquire a serial image obtained by capturing a plurality of images continuously;
a determination unit configured to determine a specified section of the serial image; and
a control unit configured to move a selection position in response to a moving operation for moving the selection position in the serial image,
wherein the moving operation includes a first moving operation to put forward the selection position to a boundary position of a next specified section, and a second moving operation to return the selection position to a boundary position of a previous specified section,
wherein in a first mode, the control unit performs control to move the selection position to a position corresponding to a head of the specified section in response to the first moving operation and the second moving operation, and in a second mode, the control unit performs control to move the selection position to a position corresponding to a rear end of the specified section in response to the first moving operation and the second moving operation, and
wherein,
in the first mode, in a case where the second moving operation is performed when the selection position is a position that is within a specified section and not at a head of the specified section, the control unit performs control to move the selection position to the head of the specified section, and
in the second mode, in a case where the first moving operation is performed when the selection position is a position that is within a specified section and not at a head of the specified section, the control unit performs control to move the selection position to the rear end of the specified section.

* * * * *